US012252991B2

(12) United States Patent
Vinski et al.

(10) Patent No.: US 12,252,991 B2
(45) Date of Patent: Mar. 18, 2025

(54) SEAL ASSEMBLY FOR A ROTARY ENGINE HOUSING

(71) Applicant: Pratt & Whitney Canada Corp., Longueuil (CA)

(72) Inventors: Johnny Vinski, Chateauguay (CA); Michel Bousquet, Longueuil (CA); Jean-Philippe Simoneau, Longueuil (CA); David Gagnon-Martin, Longueuil (CA); Vincent Savaria, Laval (CA); Bruno Villeneuve, Boucherville (CA); Stephane Berube, Saint-Philippe (CA); Frederic Roy, Saint-Amabie (CA); Sebastien Bolduc, Saint-Bruno-de-Montarville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/221,651

(22) Filed: Jul. 13, 2023

(65) Prior Publication Data

US 2025/0020061 A1 Jan. 16, 2025

(51) Int. Cl.
*F01C 19/10* (2006.01)
*F01C 21/06* (2006.01)
(Continued)

(52) U.S. Cl.
CPC .............. *F01C 19/10* (2013.01); *F01C 21/06* (2013.01); *F01C 21/108* (2013.01); *F02B 55/10* (2013.01); *F04C 27/008* (2013.01)

(58) Field of Classification Search
CPC ........ F01C 19/00; F01C 19/005; F01C 19/08; F01C 19/10; F01C 21/06; F01C 21/108;
(Continued)

(56) References Cited

U.S. PATENT DOCUMENTS 3,155,311 A 11/1964 Jones
3,359,913 A * 12/1967 Halsey .................... F04C 19/10 418/149

(Continued)

OTHER PUBLICATIONS

DE102008026920A1—Fabritius-Rotary Piston Combustion Engine, Has End Side Part Designed As Two-parts, Where End Side Part Comprises End-side Path Part That Is Bent Toward Piston, And End-side Covering Part That Is Bent Away From Piston—Jun. 4, 2009—copy of the English Machine Translation. (Year: 2009).*

*Primary Examiner* — Theresa Trieu
(74) *Attorney, Agent, or Firm* — Getz Balich LLC

(57) ABSTRACT

An engine housing includes a rotor housing body, a side housing body a side plate and a seal assembly. The rotor housing body extends about an axis to form a rotor cavity. The rotor housing body extends between and to a first axial end and a second axial end. The side housing body is disposed at the first axial end. The side plate includes an inner side, an outer side, and a perimeter edge extending from the inner side to the outer side. The seal assembly includes a support ring and a spacer. The support ring and the spacer extend about the axis. The support ring is mounted to the perimeter edge by a braze joint. The spacer extends between and to a first axial spacer end and a second axial spacer end. The first axial spacer end is disposed at the support ring and the outer side.

20 Claims, 7 Drawing Sheets

(51) Int. Cl.
*F01C 21/10* (2006.01)
*F02B 55/10* (2006.01)
*F04C 27/00* (2006.01)

(58) Field of Classification Search
CPC .... F04C 15/0034; F04C 27/008; F02B 55/10; F16J 15/02; F16L 23/16
See application file for complete search history.

(56) References Cited

U.S. PATENT DOCUMENTS 3,416,459 A * 12/1968 Reimer .................. F04C 19/10 418/149
3,523,746 A * 8/1970 Griffiths ............. F04C 15/0026 418/132
3,799,706 A 3/1974 Bilobran
3,964,843 A 6/1976 Terazawa
3,975,122 A * 8/1976 Hackbarth ............. F04C 19/10 418/149
3,980,412 A * 9/1976 Terazawa ............... F04C 19/10 418/149
4,315,719 A * 2/1982 Sakamaki .............. F04C 15/06 418/133
6,439,868 B1 8/2002 Tomoiu
11,333,068 B1 5/2022 Savaria
11,613,995 B2 3/2023 Gagnon-Martin
11,761,376 B1 * 9/2023 Vinski ..................... F02B 55/08 123/200
2017/0175620 A1 * 6/2017 Villeneuve ............ F01C 11/002

* cited by examiner

SEAL ASSEMBLY FOR A ROTARY ENGINE HOUSING

TECHNICAL FIELD

This disclosure relates generally to rotary engines for aircraft and, more particularly, to a seal assembly for a rotary engine housing.

BACKGROUND OF THE ART

A rotary engine for an aircraft may be configured, for example, as a Wankel engine. The rotary engine includes one or more rotors configured to eccentrically rotate within an engine housing. The engine housing may include one or more seals or seal assemblies configured to provide fluid seals between various components and chambers of the rotary engine. Various seal and seal assembly configurations for engine housings are known for rotary engines. While these known seal and seal assembly configurations have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an engine housing for an aircraft rotary engine includes a rotor housing and a side housing assembly. The rotor housing includes a rotor housing body. The rotor housing body extends about an axis to form a rotor cavity of the engine housing. The rotor housing body extends between and to a first axial end and a second axial end. The side housing assembly includes a side housing body, a side plate, and a seal assembly. The side housing body is disposed at the first axial end. The side plate is disposed axially between the rotor housing body and the side housing body. The side plate includes an inner side, an outer side, and a perimeter edge extending from the inner side to the outer side. The inner side further forms the rotor cavity. The seal assembly includes a support ring and a spacer. The support ring and the spacer extend about the axis. The support ring is mounted to the perimeter edge by a braze joint between the support ring and the side plate. The support ring circumscribes the side plate. The spacer extends between and to a first axial spacer end and a second axial spacer end. The first axial spacer end is disposed at the support ring and the outer side. The second axial spacer end is disposed at the side housing body.

In any of the aspects or embodiments described above and herein, the rotor housing body and the side housing body may form a coolant passage. The support ring may be disposed between the rotor cavity and the coolant passage.

In any of the aspects or embodiments described above and herein, the support ring, the spacer, and the side plate may further form the coolant passage.

In any of the aspects or embodiments described above and herein, the seal assembly may further include a seal. The seal may contact the rotor housing body and the support ring.

In any of the aspects or embodiments described above and herein, the support ring may extend between and to a first axial support ring end and a second axial support ring end. The first axial support ring end may be disposed at the rotor housing body. The second axial support ring end may be disposed at the spacer. The rotor housing body may form a recess at the first axial end, and the first axial support ring end is disposed within the recess.

In any of the aspects or embodiments described above and herein, the rotor housing body may form a dovetail seal groove and the seal may be disposed in the dovetail seal groove.

In any of the aspects or embodiments described above and herein, the support ring may be formed by a single ring body extending completely around the axis.

In any of the aspects or embodiments described above and herein, the support ring may include a plurality of discrete ring body segments assembled to form the support ring.

In any of the aspects or embodiments described above and herein, the inner side may be axially spaced from the first axial end by a gap.

In any of the aspects or embodiments described above and herein, the support ring may extend between and to a first radial end and a second radial end. The first radial end may contact the side housing body. The second radial end may contact the perimeter edge.

In any of the aspects or embodiments described above and herein, the side housing body may include a side housing body material. The side plate may include a side plate material. The side housing body material may be different than the side plate material.

In any of the aspects or embodiments described above and herein, the spacer may include a spacer material. The spacer material may be different than the side housing body material and the side plate material.

In any of the aspects or embodiments described above and herein, the second axial spacer end may include an outer radial end portion and an inner radial end portion. The outer radial end portion may contact the side housing body. The inner radial end portion may be spaced from the side housing body.

According to another aspect of the present disclosure, an engine housing for an aircraft rotary engine includes a rotor housing and a side housing assembly. The rotor housing includes a rotor housing body. The rotor housing body extends about an axis to form a rotor cavity of the engine housing. The rotor housing body extends between and to a first axial end and a second axial end. The rotor housing body forms a coolant passage. The side housing assembly includes a side housing body, a side plate, and a seal assembly. The side housing body is disposed at the first axial end. The side housing body further forms the coolant passage. The side plate is disposed axially between the rotor housing body and the side housing body. The side plate further forms the rotor cavity. The seal assembly includes a support ring and a spacer. The support ring and the spacer extend about the axis. The support ring is mounted to the side plate by a braze joint. The braze joint extends circumferentially about the axis. The support ring is disposed between the rotor cavity and the coolant passage. The spacer is disposed axially between the support ring and the side housing body. The spacer is further disposed axially between the side plate and the side housing body.

In any of the aspects or embodiments described above and herein, the coolant passage may include a coolant channel and a plurality of coolant conduits. The side housing body and the side plate may form the coolant channel. The coolant channel may extend about the axis. The side housing body and the rotor housing body may form the plurality of coolant conduits. The plurality of coolant conduits may be connected in fluid communication with the coolant channel.

In any of the aspects or embodiments described above and herein, the spacer may further form the coolant channel.

In any of the aspects or embodiments described above and herein, the support ring may further form the plurality of coolant conduits.

According to another aspect of the present disclosure, an engine housing for an aircraft rotary engine includes a rotor housing and a side housing assembly. The rotor housing includes a rotor housing body. The rotor housing body extends about an axis to form a rotor cavity of the engine housing. The rotor housing body extends between and to a first axial end and a second axial end. The side housing assembly includes a side housing body, a side plate, and a seal assembly. The side housing body is disposed at the first axial end. The side plate is disposed axially between the rotor housing body and the side housing body. The side plate further forms the rotor cavity. The seal assembly includes a support ring and a spacer. The support ring and the spacer extend about the axis. The support ring extends between and to a first axial support ring end and a second axial support ring end. The support ring further extends between and to a first radial support ring end and a second radial support ring end. The first axial support ring end is disposed at the first axial end. The first radial support ring end is disposed at the side housing body. The second radial support ring end is mounted to the side plate by a braze joint. The spacer extends between and to a first axial spacer end and a second axial spacer end. The spacer further extends between and to a first radial spacer end and a second radial spacer end. The first axial spacer end is disposed at the second axial support ring end and the side plate. The second axial spacer end is disposed at the side housing body. The first radial spacer end is disposed at the side housing body.

In any of the aspects or embodiments described above and herein, the rotor housing body may form a recess at the first axial end. The first axial support ring end may be disposed within the recess.

In any of the aspects or embodiments described above and herein, the rotor housing body may form a seal groove at the recess. The seal assembly may further include a seal disposed in the seal groove. The first seal may contact the rotor housing body and the first axial support ring end.

The present disclosure, and all its aspects, embodiments and advantages associated therewith will become more readily apparent in view of the detailed description provided below, including the accompanying drawings.

DETAILED DESCRIPTION

Figure 1:
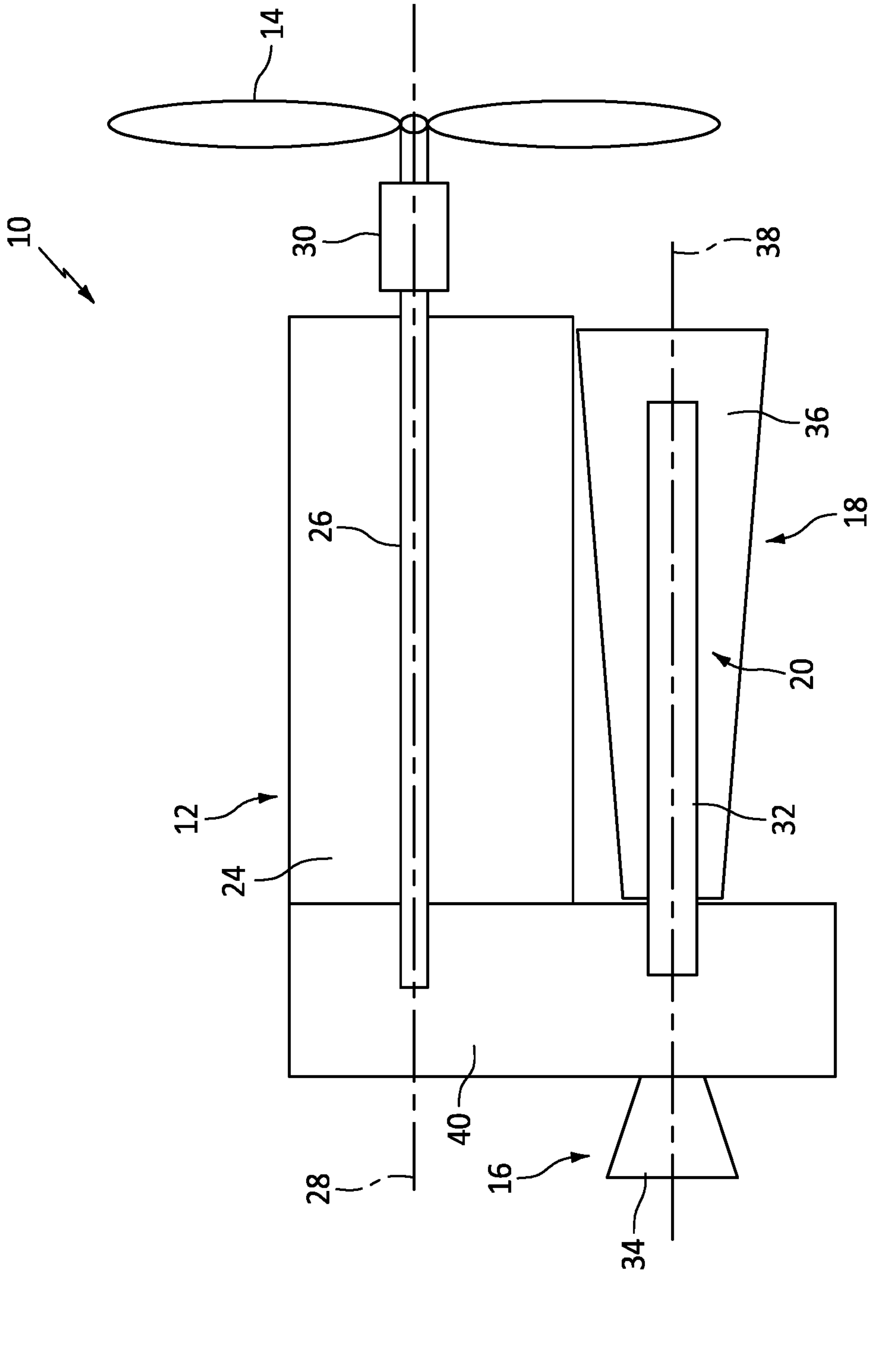
FIG. 1 illustrates a schematic view of an engine assembly, in accordance with one or more embodiments of the present disclosure.

FIG. 1 illustrates an engine assembly 10. The engine assembly 10 may form a portion of a propulsion system for an aircraft. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone). The engine assembly 10 may also form a portion of an auxiliary power unit (APU) or onboard generator for an aircraft. However, the present disclosure is not limited to any particular application of the engine assembly 10. The engine assembly 10 of FIG. 1 includes an engine 12, a rotational load 14, a compressor section 16, a turbine section 18, and a rotational assembly 20.

The engine 12 of FIG. 1 is configured as a rotary intermittent internal combustion engine, which intermittent internal combustion engine includes a rotor assembly 24 and an engine shaft 26. As will be described in further detail, the rotor assembly 24 may be configured, for example, as a Wankel engine in which an eccentric rotor configuration is used to convert fluid pressure into rotational motion.

The rotor assembly 24 is coupled to the engine shaft 26 and configured to drive the engine shaft 26 for rotation about a rotational axis 28. The engine shaft 26 is coupled to the rotational load 14 such that rotation of the engine shaft 26 by the rotor assembly 24 drives rotation of the rotational load 14. The engine shaft 26 may be coupled to the rotational load 14 by a speed-reducing gear assembly 30 of the engine 12. The speed-reducing gear assembly 30 may be configured to effect rotation of the rotational load 14 at a reduced rotational speed relative to the engine shaft 26. The rotational load 14 of FIG. 1 is configured as a propeller. Rotation of the propeller by the engine 12 may generate thrust for an aircraft which includes the engine assembly 10. The engine assembly 10 of the present disclosure may additionally or alternatively be configured to drive other rotational loads, such as, but not limited to, an electrical generator(s), a rotational accessory load, a rotor mast, a compressor, or any other suitable rotational load configuration.

The rotational assembly 20 of FIG. 1 includes a shaft 32, a bladed compressor rotor 34 of the compressor section 16, and a bladed turbine rotor 36 of the turbine section 18. The shaft 32 interconnects the bladed compressor rotor 34 and the bladed turbine rotor 36. The shaft 32, the bladed compressor rotor 34, and the bladed turbine rotor 36 are mounted to rotation about a rotational axis 38. Ambient air is received by the compressor section 16. The air is compressed by rotation of the bladed compressor rotor 34 and directed to an air intake of the engine 12. Combustion exhaust gases from the engine 12 are directed to the turbine section 18 causing the bladed turbine rotor 36 to rotate and rotationally drive the rotational assembly 20. The engine shaft 26 and the rotational assembly 20 may be rotatably coupled by a gearbox 40 of the engine assembly 10, thereby allowing the engine 12 and/or the bladed turbine rotor 36 to rotationally drive the bladed compressor rotor 34. The present disclosure, however, is not limited to the particular engine 12 and rotational assembly 20 configuration of FIG. 1.

Figure 2:
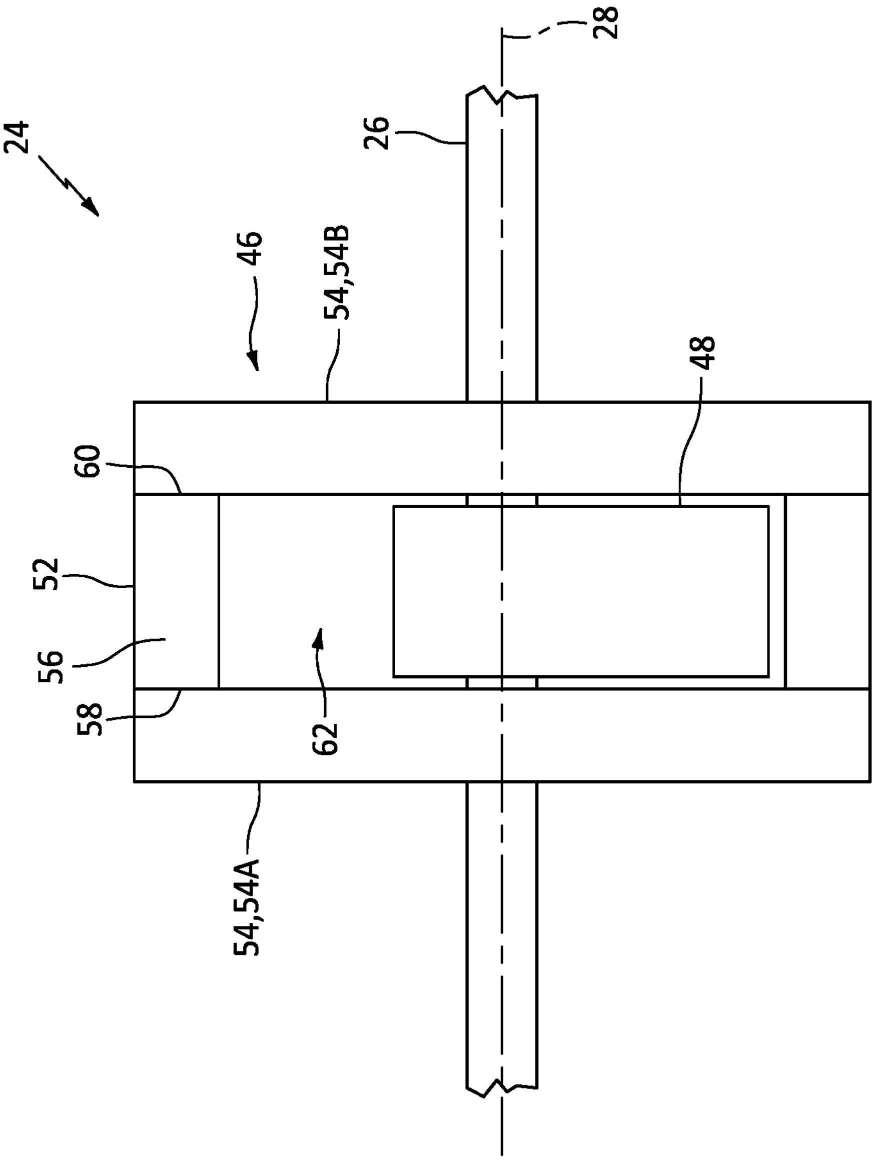
FIG. 2 illustrates a cutaway view of a rotor assembly for the engine assembly of FIG. 1, in accordance with one or more embodiments of the present disclosure.
Figure 3:
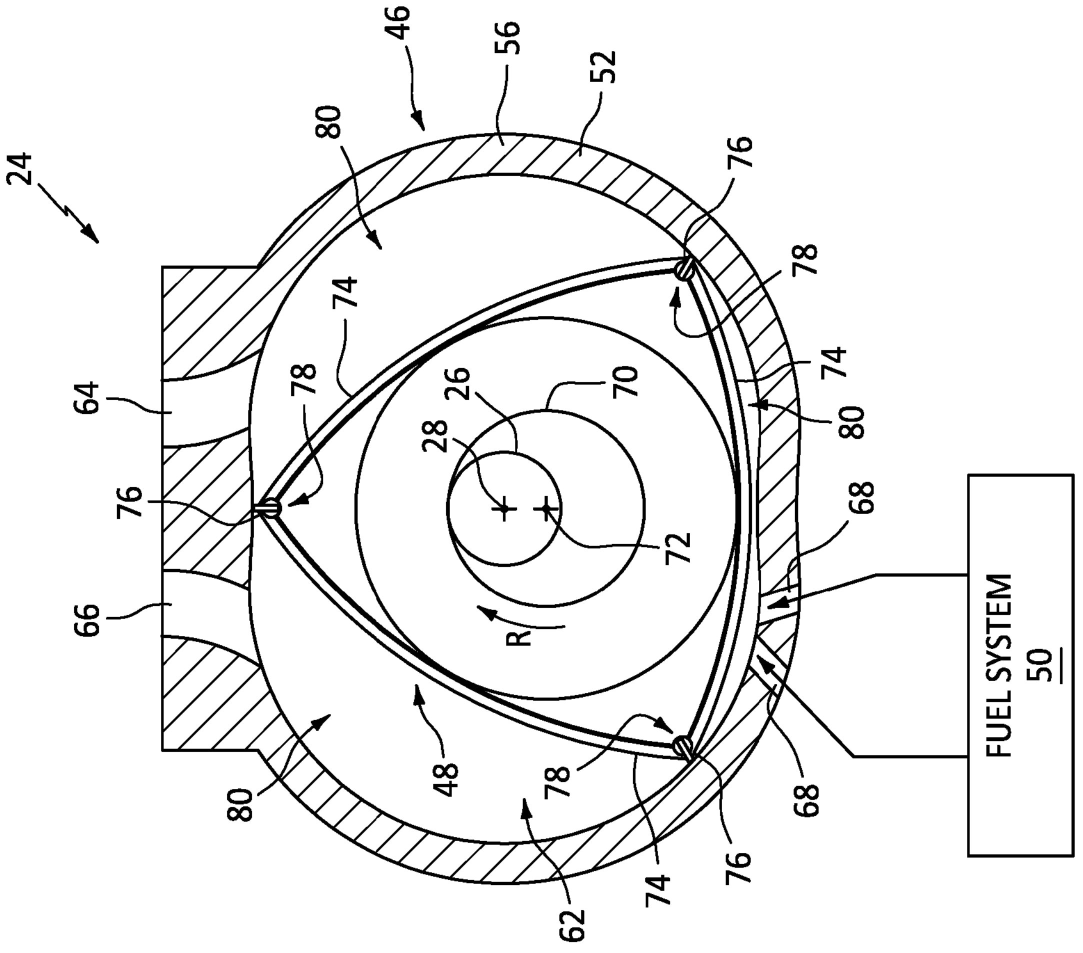
FIG. 3 illustrates a cutaway axial view of the rotor assembly of FIG. 2, in accordance with one or more embodiments of the present disclosure.

Referring to FIGS. 2 and 3, the rotor assembly 24 includes an engine housing 46, one or more rotors 48, and a fuel system 50. FIG. 2 illustrates a side, cutaway view of the rotor assembly 24. FIG. 3 illustrates a cutaway view of the rotor assembly 24 at an axial position relative to the rotational axis 28. The rotor assembly 24 of FIG. 2 includes a single rotor 48, however, the present disclosure is not limited to any particular number of rotors 48 for the rotor assembly 24. For example, the rotor assembly 24 may alternatively include a plurality of rotors 48.

The engine housing 46 of FIGS. 2 and 3 includes a rotor housing 52 and opposing side housing assemblies 54. The rotor housing 52 includes a rotor housing body 56 extending (e.g., axially extending) between and to a first end 58 of the rotor housing body 56 and a second end 60 of the rotor housing body 56. The rotor housing body 56 may extend about (e.g., completely around) the rotational axis 28. The rotor housing body 56 includes a rotor housing body material. The rotor housing body material may form all or a substantial portion of the rotor housing body 56. The rotor housing body material may be metal such as, but not limited to aluminum. The present disclosure, however, is not limited to the use of a particular material or combination of materials for the rotor housing body material.

The rotor housing body 56 of FIGS. 2 and 3 surrounds and forms a rotor cavity 62. The rotor cavity 62 of FIG. 3 is formed with two lobes, which two lobes may collectively be configured with an epitrochoid shape. The rotor housing body 56 further forms an intake port 64, an exhaust port 66, and one or more fuel system passages 68. The intake port 64 is in fluid communication with the rotor cavity 62. The intake port 64 is configured to direct compressed air to the rotor cavity 62, for example, from the compressor section 16 (see FIG. 1). The exhaust port 66 is in fluid communication with the rotor cavity 62. The exhaust port 66 is configured to direct combustion exhaust gas out of the rotor cavity 62. For example, the exhaust port 66 may be configured to direct the combustion exhaust gas from the rotor cavity 62 to the turbine section 18 (see FIG. 1). The fuel system passages 68 provide access to the rotor cavity 62 for a spark plug or other ignition device and/or for one or more fuel injectors of the fuel system 50.

The side housing assemblies 54 may be mounted to or otherwise disposed at (e.g., on, adjacent, or proximate) the first end 58 and the second end 60. For example, the side housing assemblies 54 may include a first side housing assembly 54A disposed at the first end 58 and a second side housing assembly 54B disposed at the second end 60. The side housing assemblies 54 further form the rotor cavity 62 (e.g., axial bounds of the rotor cavity 62). Each of the first side housing assembly 54A and the second side housing assembly 54B may include a respective shaft aperture (not shown) through which the engine shaft 26 may extend along the rotational axis 28 through the rotor cavity 62.

The rotor 48 of FIGS. 2 and 3 is coupled to an eccentric portion 70 of the engine shaft 26. The rotor 48 is disposed within the rotor cavity 62. The rotor 48 is configured to rotate (e.g., in rotation direction R) with the eccentric portion 70 about a rotational axis 72 of the rotor 48 to perform orbital revolutions within the rotor cavity 62. The rotational axis 72 may be offset from and parallel to the rotational axis 28.

Briefly, the rotor 48 of FIG. 3 includes three sides 74 and three apex seals 76. The sides 74 of the rotor 48 form a generally triangular cross-sectional shape of the rotor 48 (e.g., along a plane extending perpendicular to the rotational axis 72). The sides 74 may be configured with a convex curvature, which convex curvature faces away from the rotational axis 72. Each side 74 intersects each other side 74 at an apex portion 78 of the rotor 48. Each of the apex seals 76 is disposed at a respective one of the apex portions 78. Each apex portion 78 may include a slot, channel, or other attachment configuration for retaining a respective one of the apex seals 76. Each of the apex seals 76 extends outward (e.g., radially outward) from each respective one of the apex portions 78 toward the rotor housing body 56. The apex seals 76 may be configured as spring-loaded seals, which spring-loaded seals may be biased toward an outer radial position. Each of the apex seals 76 is configured to sealingly contact the rotor housing body 56, thereby forming three separate working chambers 80 of variable volume between the rotor 48 and the rotor housing body 56.

In operation of the engine 12, the fuel system 50 is configured to effect rotation of the rotor 48 by directing a fuel into the rotor cavity 62 and igniting the fuel in a defined sequence. During each orbital revolution of the rotor 48, each working chamber 80 varies in volume and moves about the rotor cavity 62 to undergo four phases of intake, compression, expansion, and exhaust, thereby driving rotation of the rotor 48 and the shaft 26.

Figure 4:
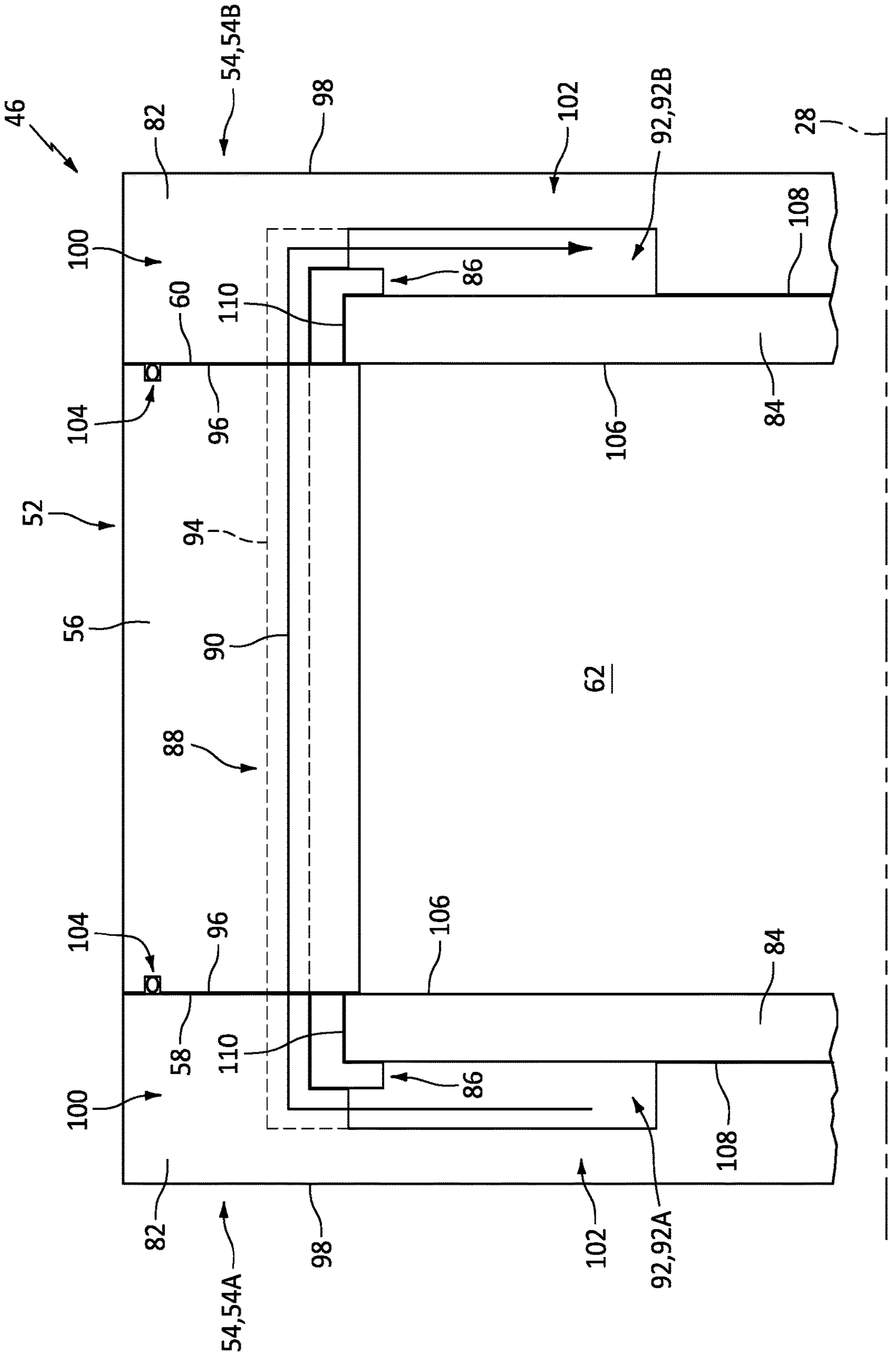
FIG. 4 illustrates a cutaway view of a portion of an engine housing for the rotor assembly of FIG. 2, in accordance with one or more embodiments of the present disclosure.

FIG. 4 illustrates a cutaway view of a portion of the engine housing 46 including the rotor housing 52 and the side housing assemblies 54. Each of the side housing assemblies 54 includes a side housing body 82, a side plate 84, and a seal assembly 86.

The rotor housing 52 and the side housing assemblies 54 of FIG. 4 include a coolant passage 88. The coolant passage 88 is configured to direct a coolant through the rotor housing 52 and the side housing assemblies 54 along a coolant flow path 90 to facilitate cooling of the rotor housing 52 and the side housing assemblies 54. Each of the side housing assemblies 54 forms a coolant channel 92 of the coolant passage 88. For example, the first side housing assembly 54A forms a first coolant channel 92A of the coolant passage 88 and the second side housing assembly 54B forms a second coolant channel 92B of the coolant passage 88. The coolant channel 92 is formed by and disposed between (e.g., axially between) the side housing body 82 and the side plate 84. The coolant channel 92 may extend about (e.g., completely around) the rotational axis 28. The coolant channel 92 for each of the side housing assemblies 54 may include a coolant inlet or a coolant outlet (not shown) for directing coolant into and out of the coolant passage 88 along the coolant flow path 90. The rotor housing 52 and the side housing assemblies 54 further form a plurality of coolant conduits 94 of the coolant passage 88. The coolant conduits 94 extend axially between and connect the coolant channel 92 for each of the side housing assemblies 54 (e.g., the coolant conduits 94 connect the first coolant channel 92A to the second coolant channel 92B). The coolant conduits 94 are distributed about the rotational axis 28 to form a coolant jacket of the coolant passage 88 within the engine housing 46. FIG. 4 illustrates one of the cooling conduits 94 in dashed lines.

The side housing body 82 extends (e.g., axially extends) between and to an inner side 96 of the side housing body 82 and an outer side 98 of the side housing body 82. The side housing body 82 includes an outer radial body portion 100 and an inner radial body portion 102. The outer radial body portion 100 is disposed radially outward of the coolant passage 88. The inner radial body portion 102 extends radially inward from the outer radial body portion 100. The inner radial body portion 102 forms portions of the coolant passage 88 (e.g., the coolant channel 92 and the coolant conduits 94) at (e.g., on, adjacent, or proximate) the inner side 96. The engine housing 46 of FIG. 4 includes outer coolant seals 104 (e.g., O-rings) positioned between the outer radial body portion 100 (e.g., the inner side 96) and the rotor housing body 56. The outer coolant seals 104 extend about (e.g., completely around) the rotational axis 28 between the rotor housing body 56 and the side housing body 82. The outer coolant seals 104 of FIG. 4 are disposed within a seal groove formed by the rotor housing body 56, however, the seals 104 may alternatively be disposed within a seal groove formed by the side housing body 82. The side housing body 82 includes a side housing body material. The side housing body material may form all or a substantial portion of the side housing body 82. The side housing body material may be metal such as, but not limited to aluminum. The present disclosure, however, is not limited to the use of a particular material or combination of materials for the side housing body material.

The side plate 84 extends (e.g., axially extends relative to the rotational axis 28) between and to an inner side 106 of the side plate 84 and an outer side 108 of the side plate 84. The side plate 84 includes a perimeter edge 110 circumscribing the inner side 106 and the outer side 108. The side plate 84 (e.g., the perimeter edge 110) may have an epitrochoid shape similar to that of the rotor cavity 62. The side plate 84 is disposed axially between the rotor housing body 56 and the inner radial body portion 102 of the side housing body 82. The inner side 106 faces the rotor 48 and forms a portion of the rotor cavity 62. For example, the inner side 106 (e.g., at the perimeter edge 110) may be disposed in contact with the first end 58 or the second end 60 of the rotor housing body and the outer side 108 may be disposed in contact with the inner side 96. The outer side 108 faces and forms a portion of the coolant channel 92. The side plate 84 forms a shaft aperture for the engine shaft 26 along the rotational axis 28 (not shown). The side plate 84 includes a side plate material. The side plate material may form all or a substantial portion of the side plate 84. The side plate material may be different than the side housing body material. For example, the side plate material may be a harder material relative to the side housing body material. The side plate material may alternatively be a ceramic material such as, but not limited to, silicon carbide (SiC). The present disclosure, however, is not limited to the use of a particular material or combination of materials for the side plate material.

In at least some conventional rotary engine housings of which we are aware, the engine housing may include an O-ring forming an inner coolant seal between a rotor housing body and a side plate of the engine housing. This inner coolant seal may be disposed in contact with the rotor housing body and the side plate at a position radially between a rotor cavity and a coolant passage of the engine housing to prevent coolant from the coolant passage from leaking into the rotor cavity. To limit structural loading (e.g., axial clamping load) and resultant degradation experienced by the side plate, the rotary engine housing may be configured with a gap (e.g., an axial gap) between the side plate and the rotor housing body. The gap may close during operation of the rotary engine due to thermal expansion of the engine housing components. We have observed that to further reduce structural loading experienced by the side plate, a size (e.g., axial span) of the gap may be increased. However, increasing a size of the gap may expose the inner coolant seal to hot combustion gas from the rotor cavity, thereby causing degradation of the inner coolant seal and an increased likelihood of coolant escaping the coolant passage into the rotor cavity.

Figure 5:
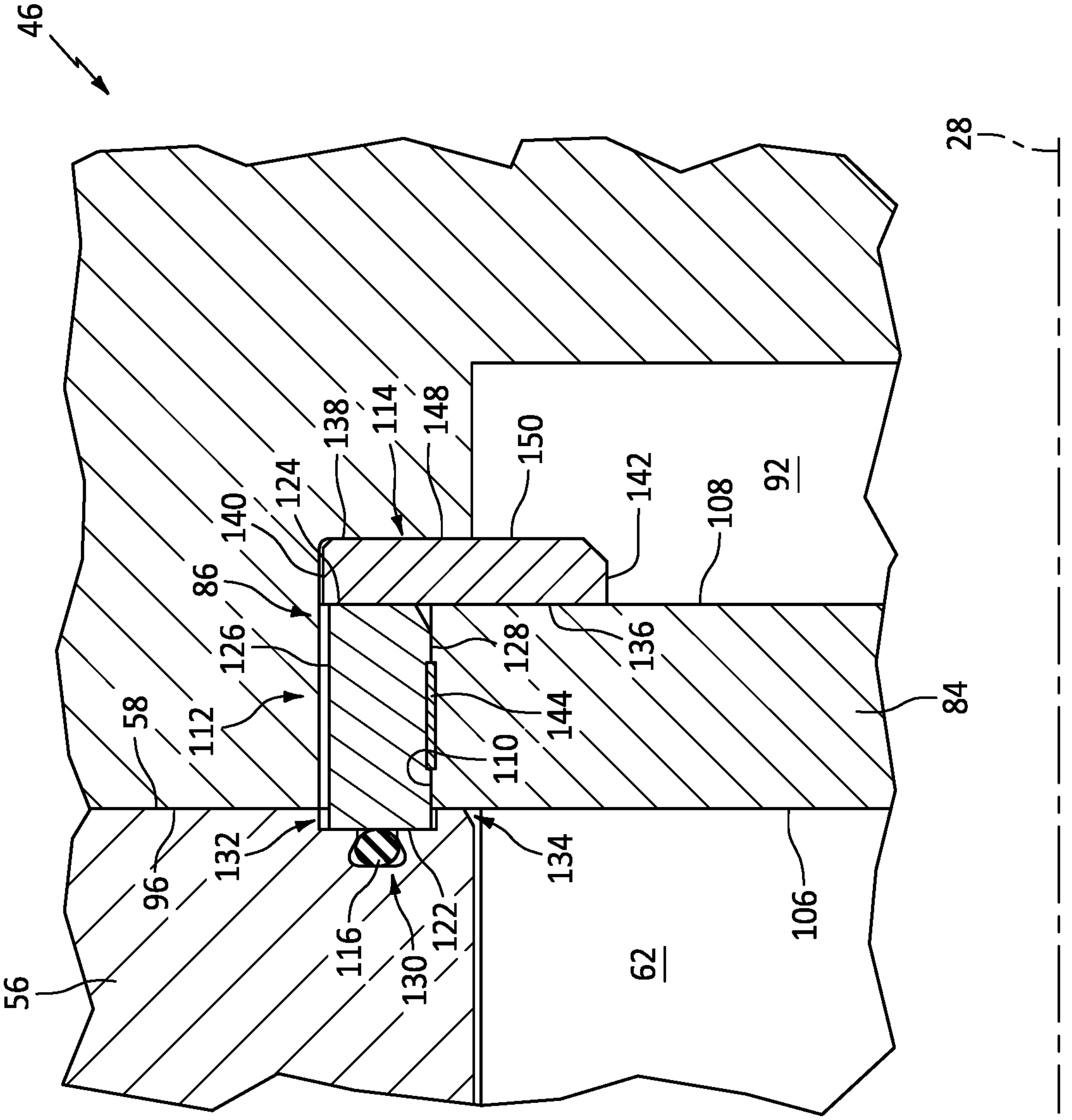
FIG. 5 illustrates another cutaway view of a portion of the engine housing for the rotor assembly of FIG. 2 including a seal assembly, in accordance with one or more embodiments of the present disclosure.

FIG. 5 illustrates a cutaway view of the engine housing 46 showing the seal assembly 86 in greater detail. The seal assembly 86 of FIG. 5 includes a support ring 112 and a spacer 114. The seal assembly 86 may additionally include a seal 116. The present disclosure seal assembly 86 facilitates fluid sealing between the rotor cavity 62 and the coolant passage 88 (see also FIG. 4) while minimizing the axial clamping load applied to the side plate 84. Moreover, the present disclosure seal assembly 86 prevents or minimizes contact of the rotor housing body 56 and the side housing body 82 with the side plate 84, which contact can cause pitting and/or fretting of the side plate material due to contact pressure and/or micro-movements, for example, between the dissimilar materials of the side plate 84 in comparison to the rotor housing body 58 and the side housing body 82.

Figure 6B:
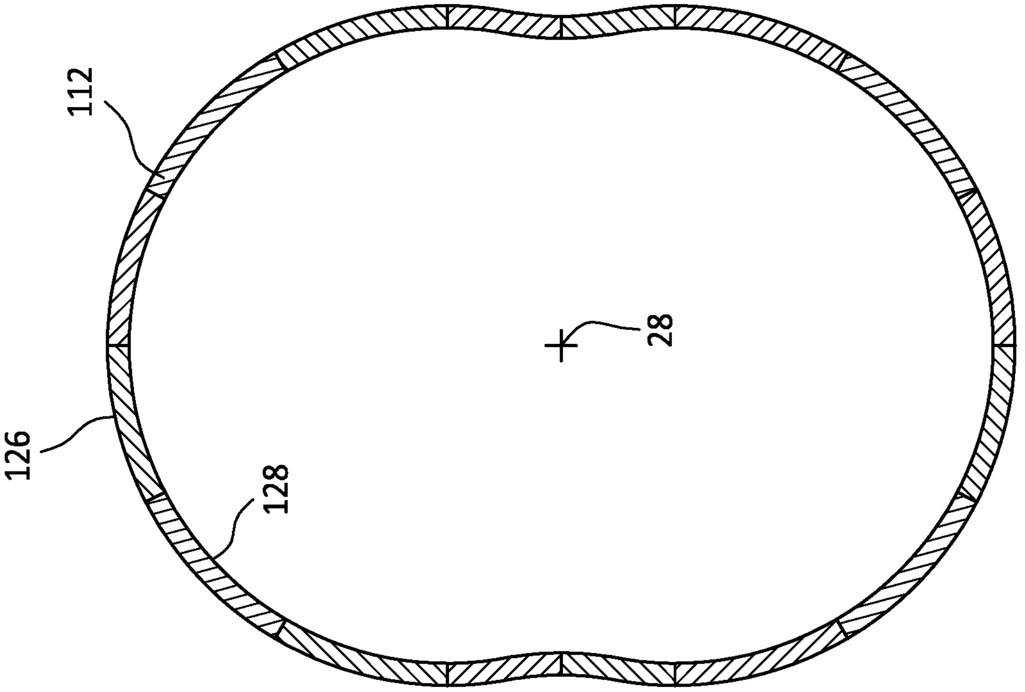
FIGS. 6A-B illustrate side views of embodiments of a support ring for the seal assembly of FIG. 5, in accordance with one or more embodiments of the present disclosure.
Figure 6A:
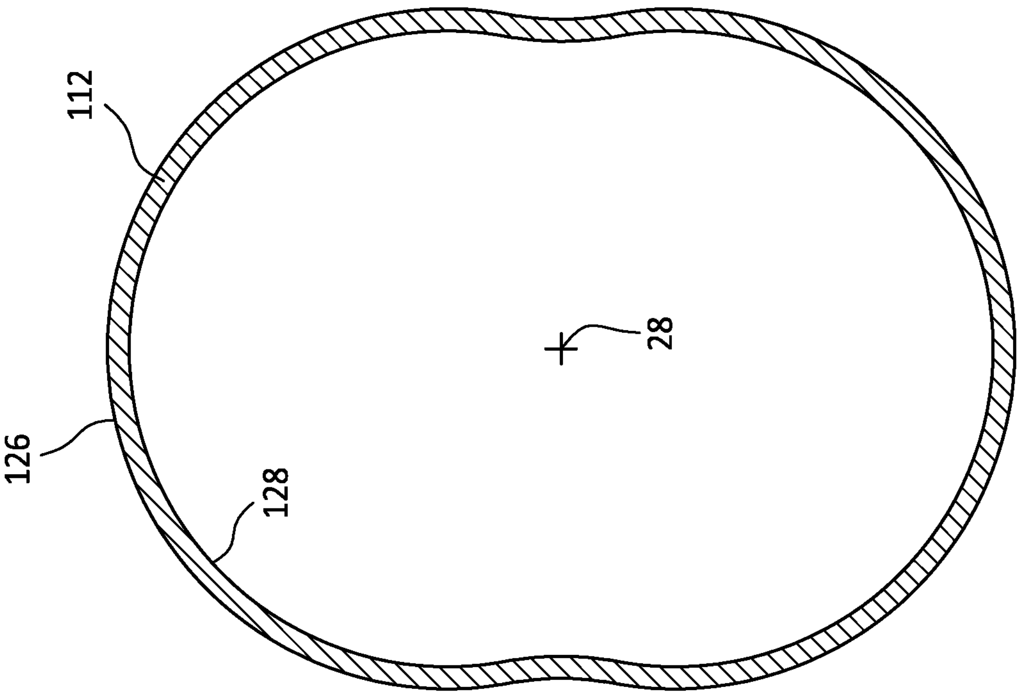
Figure 7A:
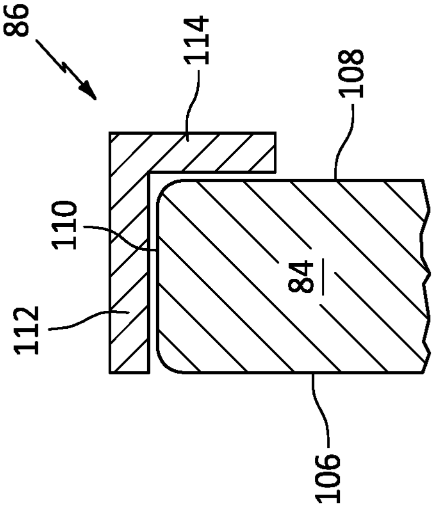
FIGS. 7A-E illustrate cutaway views of embodiments of a seal assembly, in accordance with one or more embodiments of the present disclosure.
Figure 7B:
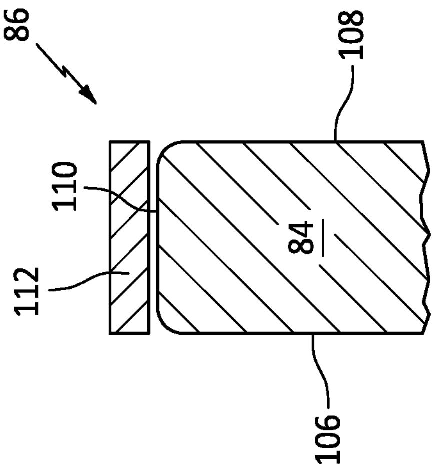
Figure 7C:
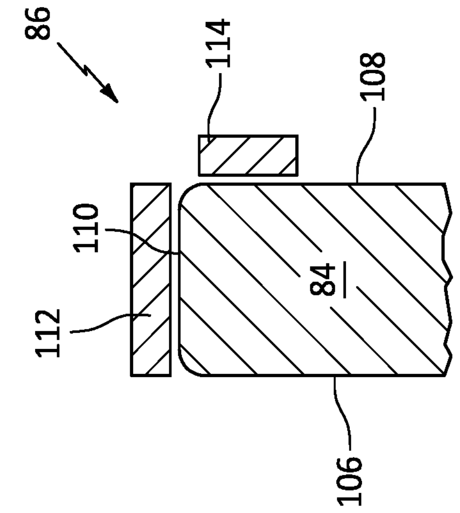
Figure 7D:
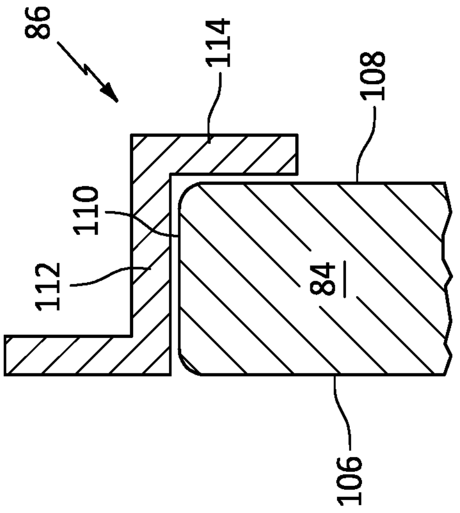
Figure 7E:
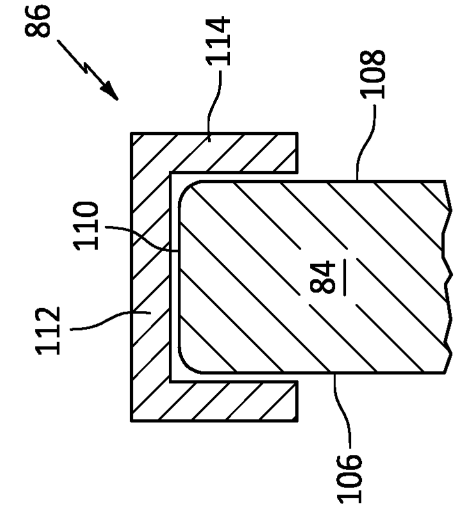

The support ring 112 extends (e.g., axially extends) between and to a first axial end 122 of the support ring 112 and a second axial end 124 of the support ring 112. The support ring 112 extends (e.g., radially extends) between and to a first radial end 126 of the support ring 112 and a second radial end 128 of the support ring 112. The support ring 112 extends about (e.g., completely around) the rotational axis 28. The support ring 112 may be formed by a single ring body extending completely around the rotational axis 28. For example, FIG. 6A illustrates the support ring 112 formed by a single ring body extending completely around the rotational axis 28. Alternatively, the support ring 112 may be formed by a plurality of discrete ring body segments (e.g., circumferential segments) assembled to form the support ring 112. For example, FIG. 6B illustrates the support ring 112 formed by a plurality of discrete ring body segments around the rotational axis 28. The support ring 112 is disposed radially between the rotor housing body 56 and the side housing body 82. The support ring 112 is disposed radially outward of the side plate 84. The support ring 112 includes a support ring material. The support ring material may form all or a substantial portion of the support ring 112. The support ring material may be a metal or metal alloy material. The support ring material may be selected, for example, to have a thermal expansion coefficient which is similar to that of the side plate material.

The first axial end 122 may contact or otherwise be disposed at (e.g., on, adjacent, or proximate) the rotor housing body 56 (e.g., the first end 58 or the second end 60). The first axial end 122 may be positioned in contact with the seal 116 (e.g., an O-ring), which seal 116 may be positioned between and in contact with the rotor housing body 56 and the support ring 112 to form a fluid seal between the rotor housing body 56 and the support ring 112. The rotor housing body 56 (e.g., at the first end 58 or the second end 60; see FIG. 4) may form a seal groove 130. The seal 116 may be disposed within the seal groove 130. The seal groove 130 of FIG. 5 is configured as a dovetail seal groove, for example, to facilitate a longer land length for the seal 116. However, the present disclosure is not limited to this particular configuration of the seal groove 130. While the seal groove 130 of FIG. 5 is formed by the rotor housing body 56, the seal groove 130 may alternatively be formed by the support ring 112 (e.g., the first axial end 122). The first axial end 122 may be disposed axially inward of the inner side 96 and/or the inner side 106 (e.g., in a direction toward the rotor housing body 56). For example, the rotor housing body 56 of FIG. 5 forms a recess 132 on the second end 60. The support ring

112 extends into (e.g., extends axially into) the recess 132 with the first axial end 122 contacting the rotor housing body 56 and/or the seal 116. The seal 116 and the seal groove 130 are disposed coincident with the recess 132. The configuration of the support ring 112 within the recess 132 forms a tortuous flow path for hot combustion gas from the rotor cavity 62 to reach the seal 116, thereby preventing or minimizing exposure of the seal 116 to the hot combustion gas. The present disclosure, however, is not limited to the particular configuration of the support ring 112 within the recess 132, as illustrated in FIG. 5 and described above. Sealing engagement between the rotor housing body 56, the support ring 112, and/or the seal 116 may facilitate the use of a larger gap (e.g., axial gap) between the rotor housing body 56 and the side plate 84 (e.g., the inner side 96), for example, at a gap location 134, thereby preventing or minimizing contact between the rotor housing body 56 and the side plate 84 and reducing structural loading experienced by the side plate 84.

The second axial end 124 may contact or otherwise be disposed at (e.g., on, adjacent, or proximate) the spacer 114. The second axial end 124 may be disposed coincident with the outer side 108.

The first radial end 126 may contact or otherwise be disposed at (e.g., on, adjacent, or proximate) the side housing body 82. For example, the first radial end 126 of FIG. 5 is spaced from (e.g., radially spaced from) axially-extending surfaces of the side housing body 82 disposed between (e.g., circumferentially between) adjacent coolant conduits 94 (see FIG. 4) by a relatively small radial gap. The first radial end 126 may, therefore, form portions of the coolant conduits 94 through the side housing assemblies 54 (see FIG. 4).

The second radial end 128 is disposed radially inward of the first radial end 126. The second radial end 128 circumscribes the side plate 84 (e.g., the perimeter edge 110). The second radial end 128 is mounted to the perimeter edge 110 by a braze joint 144 formed between the support ring 112 and the side plate 84. The braze joint 144 may extend about (e.g., completely around) the rotational axis 28 along the second radial end 128 and the perimeter edge 110. In addition to retaining the support ring 112 on the side plate 84 for sealing with the rotor housing body 56, the braze joint 144 may form a fluid seal between the support ring 112 and the side plate 84. The braze joint 144 may alternatively be formed by a plurality of braze joint segments (e.g., circumferential segments), for example, corresponding to respective ring body segments for a plurality of discrete ring body segments forming the support ring 112. For some embodiments of the support ring 112 and the side plate 84, the support ring 112 may have a substantially different thermal coefficient of expansion relative to the side plate 84. This different thermal coefficient of expansion may expose the braze joint 144 to excessive amounts of stress during certain operating conditions of the rotor assembly 24 (see FIGS. 1 and 2). The use of a plurality of braze joint segments to form the braze joint 144 may facilitate improved integrity of the braze joint 144 throughout a range of operating conditions for the rotor assembly 24. In this case, the seal assembly may include one or more additional seals (e.g., O-rings), for example, disposed between and in contact with the support ring 112 and the spacer and/or disposed between and in contact with the side plate 84 and the spacer 114.

The spacer 114 extends (e.g., axially extends) between and to a first axial end 136 of the spacer 114 and a second axial end 138 of the spacer 114. The spacer 114 extends (e.g., radially extends) between and to a first radial end 140 of the spacer 114 and a second radial end 142 of the spacer 114. The spacer 114 extends about (e.g., completely around) the rotational axis 28. The spacer 114 is disposed axially between the side housing body 82 on one side and the support ring 112 and the side plate 84 on the other side. The spacer 114 includes a spacer material. The spacer material may form all or a substantial portion of the spacer 114. The spacer material may be a metal or metal alloy material such as, but not limited to, steel, brass, or bronze, which metal or metal alloy material is different than the side housing body material. The spacer material may alternatively be a non-metal material such as, but not limited to, a polyimide-based plastic material or a fiber-reinforced polyimide-based plastic material. Because the spacer 114 does not circumscribe the side plate 84, in contrast to the support ring 112, the spacer material may be selected with less concern for thermal expansion coefficient in comparison to the support ring material. Instead, the spacer material may be selected to reduce wear between the spacer 114 (e.g., the first axial end 136) and the side plate 84 (e.g., the outer side 108). The spacer 114 may include a coating or other material disposed on the spacer material. The coating or other material may be configured, for example, to reduce wear between the spacer 114 and the side plate 84.

The first axial end 136 may contact or otherwise be disposed at (e.g., on, adjacent, or proximate) the side plate 84 (e.g., outer side 108) and the support ring 112 (e.g., the second axial end 124).

The second axial end 138 includes an outer radial end portion 148 and an inner radial end portion 150. The outer radial end portion 148 extends (e.g., radially extends) from the first radial end 140 to the inner radial end portion 150. The inner radial end portion 150 extends from the outer radial end portion 148 to the second radial end 142. The outer radial end portion 148 may contact or otherwise be disposed at (e.g., on, adjacent, or proximate) the side housing body 82. The inner radial end portion 150 may not contact the side housing body 82 (e.g., the inner radial end portion 150 is spaced from the side housing body 82). For example, the inner radial end portion 150 may form a portion of the coolant channel 92.

The first radial end 140 may contact or otherwise be disposed at (e.g., on, adjacent, or proximate) the side housing body 82. For example, the first radial end 140 of FIG. 5 is disposed in contact with axially-extending surfaces of the side housing body 82 disposed between (e.g., circumferentially between) adjacent coolant conduits 94 (see FIG. 4). The first radial end 140 may, therefore, form portions of the coolant conduits 94 through the side housing assemblies 54.

The second radial end 142 is disposed radially inward of the first radial end 140. The second radial end 142 may be disposed radially coincident with the side plate 84 and within the coolant channel 92.

FIGS. 7A-E illustrate cutaway views of various exemplary configurations of the seal assembly 86. The support ring 112 and the spacer 114 may be discrete bodies as described above with respect to FIG. 5. Alternatively, in some embodiments, the support ring 112 and the spacer 114 may be formed by a single, monolithic body (see, e.g., FIGS. 7A, 7D, and 7E). In some other embodiments, however, the seal assembly 86 may not include the spacer 114 (see, e.g., FIG. 7B). The support ring 112 and/or the spacer 114 of the seal assembly 86 may be configured to accommodate the limited space available at (e.g., on, adjacent, or proximate) an interface between the rotor housing body 56, the side housing body 82, and the side plate 84, to prevent or minimize contact between the side plate 84 and the rotor housing body 56 or the side housing body 82, and to provide a secure mounting interface (e.g., using the braze joint 144) between the support ring 112 and the seal plate 84 (see FIG. 5). The present disclosure, of course, is not limited to the exemplary configurations of the seal assembly 86 illustrated in FIGS. 7A-E.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An engine housing for an aircraft rotary engine, the engine housing comprising:

a rotor housing including a rotor housing body, the rotor housing body extends about an axis to form a rotor cavity of the engine housing, and the rotor housing body extends between and to a first axial end and a second axial end; and a side housing assembly including a side housing body, a side plate, and a seal assembly, the side housing body is disposed at the first axial end, the side plate is disposed axially between the rotor housing body and the side housing body, the side plate includes an inner side, an outer side, and a perimeter edge extending from the inner side to the outer side, and the inner side further forms the rotor cavity, and the seal assembly includes a support ring and a spacer, the support ring and the spacer extend about the axis, the support ring is mounted to the perimeter edge of the side plate by a braze joint between the support ring and the side plate, the support ring circumscribes the side plate, the spacer extends between and to a first axial spacer end and a second axial spacer end, the first axial spacer end is disposed at the support ring and the outer side of the side plate, the second axial spacer end is disposed at the side housing body.

2. The engine housing of claim 1, wherein the rotor housing body and the side housing body form a coolant passage, and the support ring is disposed between the rotor cavity and the coolant passage.

3. The engine housing of claim 2, wherein the support ring, the spacer, and the side plate further form the coolant passage.

4. The engine housing of claim 1, wherein the seal assembly further includes a seal, and the seal contacts the rotor housing body and the support ring.

5. The engine housing of claim 4, wherein:

the support ring extends between and to a first axial support ring end and a second axial support ring end, the first axial support ring end is disposed at the rotor housing body, and the second axial support ring end is disposed at the spacer; and the rotor housing body forms a recess at the first axial end, and the first axial support ring end is disposed within the recess.

6. The engine housing of claim 4, wherein the rotor housing body forms a dovetail seal groove and the seal is disposed in the dovetail seal groove.

7. The engine housing of claim 1, wherein the support ring is formed by a single ring body extending completely around the axis.

8. The engine housing of claim 1, wherein the support ring includes a plurality of discrete ring body segments assembled to form the support ring.

9. The engine housing of claim 1, wherein the inner side of the side plate is axially spaced from the first axial end of the side housing body by a gap.

10. The engine housing of claim 1, wherein the support ring extends between and to a first radial end and a second radial end, the first radial end contacts the side housing body, and the second radial end contacts the perimeter edge.

11. The engine housing of claim 1, wherein the side housing body includes a side housing body material, the side plate includes a side plate material, and the side housing body material is different than the side plate material.

12. The engine housing of claim 11, wherein the spacer includes a spacer material, and the spacer material is different than the side housing body material and the side plate material.

13. The engine housing of claim 1, wherein the second axial spacer end includes an outer radial end portion and an inner radial end portion, the outer radial end portion contacts the side housing body, and the inner radial end portion is spaced from the side housing body.

14. An engine housing for an aircraft rotary engine, the engine housing comprising:

a rotor housing including a rotor housing body, the rotor housing body extends about an axis to form a rotor cavity of the engine housing, the rotor housing body extends between and to a first axial end and a second axial end, and the rotor housing body forms a coolant passage; and a side housing assembly including a side housing body, a side plate, and a seal assembly, the side housing body is disposed at the first axial end, and the side housing body further forms the coolant passage, the side plate is disposed axially between the rotor housing body and the side housing body, and the side plate further forms the rotor cavity, and the seal assembly includes a support ring and a spacer, the support ring and the spacer extend about the axis, the support ring is mounted to the side plate by a braze joint, the braze joint extends circumferentially about the axis, the support ring is disposed between the rotor cavity and the coolant passage, the spacer is disposed axially between the support ring and the side housing body, and the spacer is further disposed axially between the side plate and the side housing body.

15. The engine housing of claim 14, wherein the coolant passage includes a coolant channel and a plurality of coolant conduits, the side housing body and the side plate form the coolant channel, the coolant channel extends about the axis, the side housing body and the rotor housing body form the plurality of coolant conduits, and the plurality of coolant conduits are connected in fluid communication with the coolant channel.

16. The engine housing of claim 15, wherein the spacer further forms the coolant channel.

17. The engine housing of claim 15, wherein the support ring further forms the plurality of coolant conduits.

18. An engine housing for an aircraft rotary engine, the engine housing comprising:

a rotor housing including a rotor housing body, the rotor housing body extends about an axis to form a rotor cavity of the engine housing, and the rotor housing body extends between and to a first axial end and a second axial end; and a side housing assembly including a side housing body, a side plate, and a seal assembly, the side housing body is disposed at the first axial end of the rotor housing body, the side plate is disposed axially between the rotor housing body and the side housing body, and the side plate further forms the rotor cavity, and the seal assembly includes a support ring and a spacer, the support ring and the spacer extend about the axis, the support ring extends between and to a first axial support ring end and a second axial support ring end, the support ring further extends between and to a first radial support ring end and a second radial support ring end, the first axial support ring end is disposed at the first axial end, the first radial support ring end is disposed at the side housing body, and the second radial support ring end is mounted to the side plate by a braze joint, and the spacer extends between and to a first axial spacer end and a second axial spacer end, the spacer further extends between and to a first radial spacer end and a second radial spacer end, the first axial spacer end is disposed at the second axial support ring end and the side plate, the second axial spacer end is disposed at the side housing body, and the first radial spacer end is disposed at the side housing body.

19. The engine housing of claim 18, wherein the rotor housing body forms a recess at the first axial end, and the first axial support ring end is disposed within the recess.

20. The engine housing of claim 19, wherein the rotor housing body forms a seal groove at the recess, the seal assembly further includes a seal disposed in the seal groove, and the first seal contacts the rotor housing body and the first axial support ring end.

* * * * *